US009489869B2

(12) United States Patent
Riojas et al.

(10) Patent No.: US 9,489,869 B2
(45) Date of Patent: Nov. 8, 2016

(54) PORTABLE LOW COST COMPUTER ASSISTED SURGICAL TRAINER AND ASSESSMENT SYSTEM

(71) Applicant: Arizona Board of Regents, on behalf of The University of Arizona, Tuscon, AZ (US)

(72) Inventors: Mario Riojas, Tucson, AZ (US); Jerzy W. Rozenblit, Tucson, AZ (US); Liana Napalkova, Riga (LV); Allan J. Hamilton, Tucson, AZ (US); Chuan Feng, Chandler, AZ (US)

(73) Assignee: ARIZONA BOARD OF REGENTS, ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 320 days.

(21) Appl. No.: 13/776,596

(22) Filed: Feb. 25, 2013

(65) Prior Publication Data
US 2013/0224709 A1 Aug. 29, 2013

Related U.S. Application Data

(60) Provisional application No. 61/634,209, filed on Feb. 24, 2012.

(51) Int. Cl.
*G09B 23/26* (2006.01)
*G09B 23/28* (2006.01)
(52) U.S. Cl.
CPC .................................... *G09B 23/28* (2013.01)
(58) Field of Classification Search
CPC .................... G09B 23/289; A61B 19/2203
USPC ............................................................ 434/262
See application file for complete search history.

(56) References Cited

U.S. PATENT DOCUMENTS 5,920,319 A * 7/1999 Vining ................. A61B 5/1076
345/419
6,205,411 B1* 3/2001 DiGioia, III ........... A61B 17/15
623/901
(Continued)

OTHER PUBLICATIONS

R.K. Reznick, S. Smee, J.S. Baumber, R. Cohen, A. Rothman, D. Blackmore, M. Bérard, Guidelines for estimating the real cost of and objective structured clinical examination, Academic Medicine 68 (7) (1993) 513-517.

(Continued)

*Primary Examiner* — Robert J Utama
*Assistant Examiner* — Sadaruz Zaman
(74) *Attorney, Agent, or Firm* — McDonnell Boehnen Hulbert & Berghoff LLP

(57) ABSTRACT

A system is provided for evaluating MIS procedures. The system includes a sensor configured to receive task-performance data, block components, and actuating components. The sensor, block components, and actuating components are configured to simulate a training task. The system also includes a processor. The processor is configured to determine, based on the received task-performance data, a trial task-performance metric corresponding to a trial performance of the training task. The processor is also configured to select a reference task-performance metric from a plurality of reference task-performance metrics. Each reference task-performance metric in the plurality corresponds to a respective reference performance of the training task. The processor is additionally configured to determine, based on a comparison of the trial task-performance metric to the reference task-performance metric, a task-performance classification level. The processor is further configured to cause a graphical display to provide an indication of the task-performance classification level.

46 Claims, 10 Drawing Sheets

(56) References Cited

U.S. PATENT DOCUMENTS

| | | | |
|---|---|---|---|
| 6,659,776 B1 | 12/2003 | Aumann et al. | |
| 6,705,871 B1 * | 3/2004 | Bevirt | G05G 9/04 345/156 |
| 6,786,896 B1 * | 9/2004 | Madhani | A61B 19/22 128/898 |
| 6,929,481 B1 * | 8/2005 | Alexander | G09B 23/285 434/262 |
| 7,253,803 B2 * | 8/2007 | Schena | G01B 5/008 345/156 |
| 7,594,815 B2 | 9/2009 | Toly et al. | |
| 7,815,436 B2 * | 10/2010 | Cunningham et al. | 434/262 |
| 7,850,456 B2 | 12/2010 | Chosack et al. | |
| 7,963,770 B2 | 6/2011 | Kukora et al. | |
| 8,382,485 B2 * | 2/2013 | Bardsley | 434/262 |
| 2001/0016804 A1 * | 8/2001 | Cunningham | G09B 23/285 703/7 |
| 2002/0115934 A1 * | 8/2002 | Tuke | A61B 19/52 600/473 |
| 2004/0030245 A1 * | 2/2004 | Noble | G09B 23/28 600/426 |
| 2005/0142525 A1 | 6/2005 | Cotin et al. | |
| 2007/0166682 A1 | 7/2007 | Yarin et al. | |
| 2008/0242953 A1 * | 10/2008 | Dew et al. | 600/300 |
| 2008/0269596 A1 * | 10/2008 | Revie | G06Q 10/087 600/424 |
| 2009/0043556 A1 * | 2/2009 | Axelson | A61B 19/50 703/11 |
| 2010/0076563 A1 * | 3/2010 | Otto | A61B 5/103 623/20.14 |
| 2010/0332194 A1 * | 12/2010 | McGuan | A61F 2/4684 703/1 |
| 2011/0029913 A1 * | 2/2011 | Boillot | G06F 3/011 715/776 |
| 2012/0028231 A1 * | 2/2012 | Misawa | G09B 23/30 434/267 |
| 2012/0143203 A1 * | 6/2012 | Nishio | A61B 17/1631 606/96 |
| 2012/0158179 A1 * | 6/2012 | Ooga | B25J 9/1633 700/259 |
| 2013/0224710 A1 * | 8/2013 | Yang | G09B 23/28 434/262 |
| 2015/0332465 A1 * | 11/2015 | Schmidt et al. | 434/262 |

OTHER PUBLICATIONS

A. Darzi, S. Mackay, Assessment of surgical competence, Quality in Health Care 2 (2001).

N. Stylopoulos, S. Cotin, S.K. Maithel, M. Ottensmeyer, P.G. Jackson, R.S. Bardsley, P.F.Neumann,D.W. Rattner, S.L. Dawson, Computer-enhanced laparoscopic training system: bridging the gap, Surgical Endoscopy 18 (5) (2004).

J. Rosen, J.D. Brown, M. Barreca, L. Chang, B. Hannaford, M. Sinanan, The blue DRAGON—a system for monitoring the kinematics and the dynamics of endoscopic tools in minimally invasive surgery for objective laparoscopic skill assessment, Studies in Health Technology and Informatics—Medicine Meets Virtual Reality 85 (2008) 412-418.

TASKit (Train Anywhere Skill Kit), printed Jul. 16, 2013, http://www.eeseducation.com/video/downloadinstructions.

Simulab Lap Trainer, printed Jul. 16, 2013, http://www.simulab.com/product/packaged-savings/laptrainer-simuvision-package.

TRLCD03-SS, printed Jul. 16, 2013, http://www.3-dmed.com.

Simbionix Lap Mentor Express, printed Jul. 16, 2013, http://simbionix.com/simulators/lap-mentor/2045-2/.

Ethicon, printed Jul. 16, 2013, http://www.ethicon.com.

Epona Medical, printed Jul. 16, 2013, http://www.lapx.eu/en.

Mimic Technologies, printed Jul. 16, 2013, http://www.mimicsimulation.ws/products.

Education Management Solutions, printed Jul. 16, 2013, http://www.ems-works.com/Products/LAP-X.

Laparos Surgical Training System, printed Jul. 16, 2013, http://ccg.ciens.ucv.ve/~ernesto/papers/CotoICCB05.pdf.

Open Incision Surgical Skills Training System Hardware, printed Jul. 16, 2013 http://www.techbriefs.com/component/content/article/11924.

Smart Surgisol, printed Jul. 16, 2013, http://istart.org/startup-idea/life-sciences-it/smart-surgisol/11153.

Martinez, et al., (2007) "Novel laparoscopic home trainer," Surg Laparosc Endosc Percutan Tech, 17(4): 300-2.

Al-abed, et al., (2009) "A Novel home laparoscopic simulator," J Surg Educ, 66(1):1-2.

Jaber (2010) "The basket trainer: A homemade laparoscopic trainer attainable to every resident," J Minim Access Surg, 6(1): 3-5.

Thomas S. Lendvay, Bradley Fields. Surgical Simulation Devices. Medscape. Jan. 2013.

* cited by examiner

PORTABLE LOW COST COMPUTER ASSISTED SURGICAL TRAINER AND ASSESSMENT SYSTEM

CROSS-REFERENCE TO RELATED APPLICATIONS

The present non-provisional utility application claims priority under 35 U.S.C. §119(e) to provisional application number U.S. 61/634,209 filed on Feb. 24, 2012, the entire contents of which are herein incorporated by reference.

BACKGROUND

Minimally invasive surgery (MIS or laparoscopic surgery) is a modern surgical technique that may require small incisions or sometimes may be performed with no incisions at all. MIS may be performed with an endoscope and/or several other long, thin surgical instruments. Accordingly, some drawbacks that may be associated with large incisions—for example, operative blood loss and post-operative pain—may be limited and recovery time may be shorter compared to traditional open surgery. Despite these advantages, MIS may be more challenging than conventional surgery because of various limitations associated with performing MIS techniques. For example, laparoscopic surgeons may be required to successfully perform surgery procedures despite potentially having restricted vision, hand-eye coordination problems, limited working space, and lack of tactile sensation, among other impediments. Accordingly, MIS may be a more difficult skill for medical students and residents to master.

Simulations with computerized surgical training systems may offer an opportunity to teach and practice surgical skills, such as MIS, outside the operating room before using such skills when performing surgeries on living patients. Known as "transfer of learning," (the application of skills and knowledge gained in one context being applied in another context), technical skills acquired, for example, on low-fidelity simulators may be transferred to improve performance on higher fidelity models such as live animals, cadavers and, eventually live human patients.

Transfer of learning may be applied in surgical procedures by abstracting the essential construct of the surgical procedure (i.e., task) in developed models that may allow trainees to perform the abstract tasks. When the right abstract tasks are selected for training, the trainee may learn to ignore the physical limitations of the training platform, thereby learning techniques that may be used while performing surgical procedures.

SUMMARY

This disclosure generally involves methods and systems for evaluating the performance of surgical techniques, such as MIS techniques.

In a first embodiment, a method is provided. The method includes receiving task-performance data from at least one sensor of a training system. The training system further includes at least one block component and at least one actuating component. The at least one sensor, the at least one block component, and the at least one actuating component are configured to simulate a training task. The method also includes determining, based on the received task-performance data, at least one trial task-performance metric corresponding to a trial performance of the training task. The method additionally includes selecting at least one reference task-performance metric from a plurality of reference task-performance metrics. Each reference task-performance metric in the plurality corresponds to a respective reference performance of the training task. The method further includes determining, based on a comparison of the at least one trial task-performance metric to the at least one reference task-performance metric, a task-performance classification level. The method yet even further includes causing a graphical display to provide an indication of the task-performance classification level.

In a second embodiment, a system is provided. The system includes at least one sensor configured to receive task-performance data, at least one block component, and at least one actuating component. The at least one sensor, the at least one block component, and the at least one actuating component are configured to simulate a training task. The system also includes a processor. The processor is configured to determine, based on the received task-performance data, at least one trial task-performance metric corresponding to a trial performance of the training task. The processor is also configured to select at least one reference task-performance metric from a plurality of reference task-performance metrics. Each reference task-performance metric in the plurality corresponds to a respective reference performance of the training task. The processor is additionally configured to determine, based on a comparison of the at least one trial task-performance metric to the at least one reference task-performance metric, a task-performance classification level. The processor is further configured to cause a graphical display to provide an indication of the task-performance classification level.

In a third embodiment, a physical computer-readable medium having stored thereon program instructions executable by a processor to cause the processor to perform functions is provided. The functions include receiving task-performance data from at least one sensor of a training system. The training system further includes at least one block component and at least one actuating component. The at least one sensor, the at least one block component, and the at least one actuating component are configured to simulate a training task. The functions also include determining, based on the received task-performance data, at least one trial task-performance metric corresponding to a trial performance of the training task. The functions additionally include selecting at least one reference task-performance metric from a plurality of reference task-performance metrics. Each reference task-performance metric in the plurality corresponds to a respective reference performance of the training task. The functions further include determining, based on a comparison of the at least one trial task-performance metric to the at least one reference task-performance metric, a task-performance classification level. The functions yet even further include causing a graphical display to provide an indication of the task-performance classification level.

The foregoing summary is illustrative only and should not be taken in any way to be limiting. In addition to the illustrative aspects, embodiments, and features described above, further aspects, embodiments, and features will become apparent by reference to the figures and the following detailed description.

BRIEF DESCRIPTION OF THE DRAWINGS

The following drawings in conjunction with the detailed description may be used to understand how the various embodiments of the present invention provide the stated and further advantages.

DETAILED DESCRIPTION

Figure 1A:
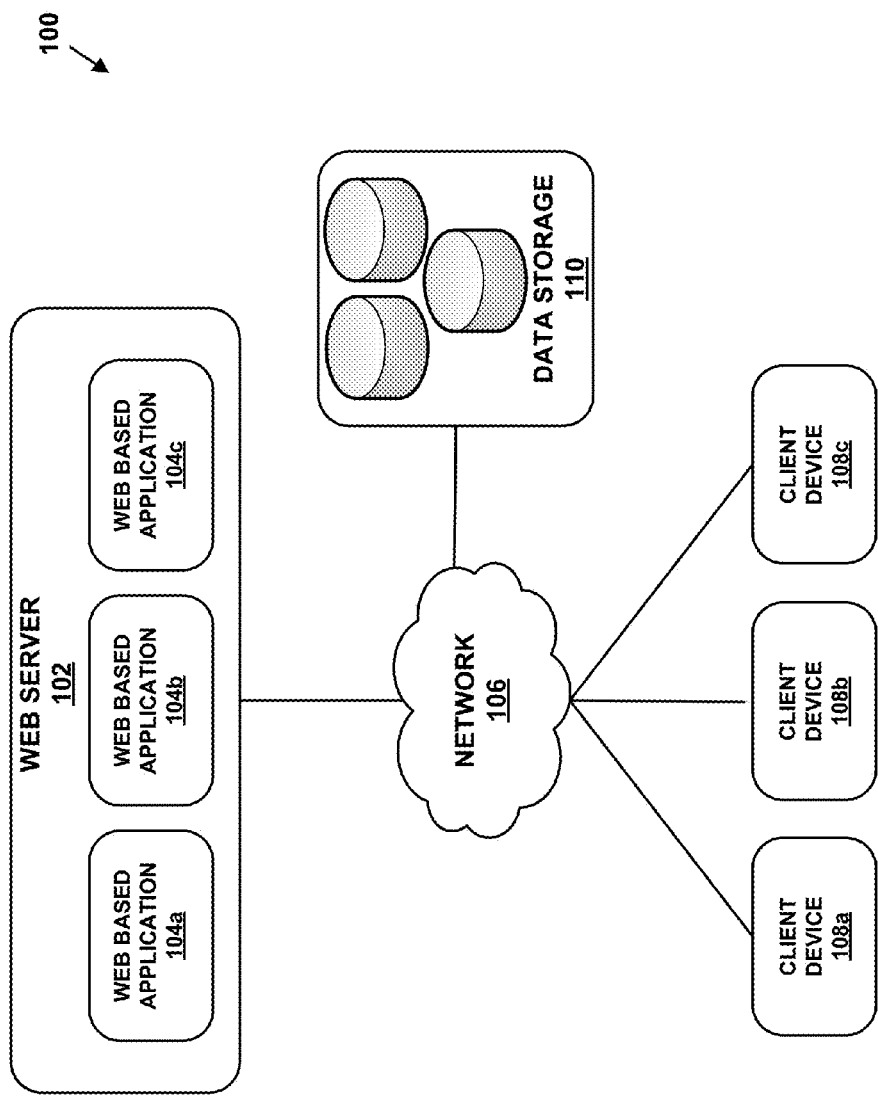
FIG. 1A illustrates a block diagram of an example network environment in which the methods and systems described herein may be implemented, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Special training processes may be used to help address the above-noted difficulties associated with performing surgical techniques, such as MIS techniques. In typical approaches to training, when students are evaluated on their minimally invasive surgical skills, a trainer serves as both an observer and an evaluator while the student (or trainee) performs a surgical exercise or technique. Known as the apprenticeship model, this approach utilizes metrics, such as low, medium, high or other comparable terms, along with mental rules or guidelines (e.g., recorded by the trainer or expert surgeon) to compare the values of the metrics with expert criteria. Based on the comparison, qualitative judgment may then be made by the trainer.

However, due to the subjective nature of the apprenticeship model along with the lack of expert surgeons' awareness of how the judgment process takes place, imprecise rules may result for the evaluation of surgical skills, such as MIS skills. Moreover, assessment by observation generally may not meet the validity and reliability criteria necessary for an objective evaluation, and the apprenticeship model is becoming ever more difficult to sustain because traditional surgical education methods are not suitable for MIS training.

Currently, methods that may serve to objectively evaluate surgical skills range from checklists and global scores to complex virtual reality based systems. For example, objective structure assessment of technical skills (OSATS) is a methodology consisting of six stations where residents and trainees perform procedures such as placing sutures in a pad of synthetic skin, joining two cut ends of bowel, and inserting an intercostal catheter. The procedures are performed on live animals or bench models in fixed time periods. Staff surgeons observe the performance of the trainees and evaluate them using a checklist and a global scoring sheet.

In another example, minimally Invasive Surgical Trainer-Virtual Reality (MIST-VR) is a popular, low-fidelity, virtual reality system that attempts to replicate the skills of laparoscopic operating, but not replicate the appearance (the virtual environment consists of a wire cage in which various geometric objects may be manipulated with two tools, each having 5 degrees of freedom). MIST may distinguish between novice, junior, and experienced surgeons using scores derived from weighted averages of performance metrics such as: time to task completion, errors and economy of movement.

In another example, Computer Enhanced Laparoscopic Training System (CELTS) is a system that may be capable of tracking the motion of two laparoscopic instruments while a trainee performs a variety of surgical training tasks. CELTS includes a box-type video trainer platform that uses conventional laparoscopic imaging equipment coupled with real laparoscopic instruments that are placed through a Virtual Laparoscopic Interface. Using kinematics analysis theory, CELTS generates five quantitative metrics to measure the trainee: time to complete the task, depth perception, path length of the instruments, motion smoothness, and response orientation. Using standard scores statistics, the performances of trainees are compared to the performances of expert surgeons.

Several other simulation systems exist as well including Blue-Dragon System, LapSim trainer, ProMIS System, and Immersion Simulators, to name a few.

Despite the variety of surgical trainers already in existence, many of them are confined to low-cost non-computerized trainers with limited assessment support or to high-cost virtual trainers that are inaccessible to typical medical students. Moreover, many of the surgical trainers noted above rely on judgment criteria generated at an early stage of a design phase of the system, and may present no way to offset the subjectivity inherited from relying solely on the performance data of the selection subjects used during the design phase of the system. Further, the judgment criteria are meant to remain intact over time, making it difficult for a trainee who has reached the expert level to keep improving. Additionally, the above noted surgical systems may not provide residents or surgeons a way to practice laparoscopic surgery and receive objective feedback on their performance outside of a dry lab or when unsupervised by a coach.

Herein, a computerized system for the assessment and training of MIS skills is provided that may overcome some or all of the above noted drawbacks. The system includes a set of physical building units, sensors and actuators that may embody a variety of training tasks. The sensors may gather task-performance data (data related to the performance of a training task) in real-time, and the task-performance data may be processed to classify a level of expertise shown by a given trainee of the system. Based on a unique set of performance metrics, the system may compare quantitative and qualitative performance results of the trainee against the performance results of other that have previously performed the training task. The computer system may also provide visual guidance to the trainee on how to perform an example task.

B. Example Systems

FIG. 1A illustrates a block diagram of one example network environment in which the methods and systems disclosed herein may be implemented. The illustrated environment includes a web server 102, client devices 108a, 108b, and 108c . . . , 108(N) each configured to communicate with web server 102 over the Network 106, and a data storage 110.

Note that many variations of example network environment 100 are possible. For example, although FIG. 1A explicitly shows only one web server 102, network environment 100 could include multiples web servers. As another example, one or more of the functional components could be omitted altogether. Thus, various components of network environment 100 can work alone or in combination to carry out the functions of the present methods, including those functions described below with respect to FIGS. 3A and 3B. Which components are involved may depend on the particular network environment used.

Web server 102 may be any computing device capable of carrying out the methods and functions described herein, and will be discussed in more detail with respect to FIG. 2A. Web server 102 may include one or more web-based applications 104a-c that may be configured to perform the methods disclosed herein. For example, the web-based applications 104a-c may be configured to perform a portion of, or all of the methods discussed in reference to FIGS. 3A-3B. The web applications may be implemented using numerous web application frameworks including, for example, PHP, JavaServer, ASP.NET, or Cold Fusion to name a few. Many other web application frameworks exist and may be used to implement the web application. Web server 102 may also include other components that are discussed in more detail later in this disclosure, such as a processor, one or more memory components, or one or more network interfaces, for example.

The client devices 108a, 108b, and 108c may also be used to help carry out the methods described herein. The client devices may be any suitable computing device, such as a tablet computer, laptop computer, desktop computer, network terminal, mobile computing device (e.g., smart phone), etc., and will be discussed in more detail with respect to FIG. 2B. In other illustrative embodiments, the client devices may take the form of a portable media device, personal digital assistant, notebook computer, or any other mobile device capable of accessing web server 102 over the Network 106. Network 106 may take the form of any known network such as a LAN, WAN, or the Internet.

Data storage 110 may include one or more computer-readable storage media that can be read or accessed by at least one of the client devices 108a, 108b, and 108c or web server 102, for example. The one or more computer-readable storage media may include volatile and/or non-volatile storage components, such as optical, magnetic, organic or other memory or disc storage. In some embodiments, the data storage 110 may be implemented using a single physical device (e.g., one optical, magnetic, organic or other memory or disc storage unit), while in other embodiments, the data storage 110 may be implemented using two or more physical devices.

Data storage 110 may contain data as well as stored program logic, executable by a processor, and capable of manipulating the data. By way of example, the data in data storage 110 may contain one or more stored datasets that include trainee information, information about prior classifications of a given trainee, task-performance data, task-performance metrics, and video data associated with tasks that may have been previously performed by the trainee. In some examples, data storage 110 may also contain data representing example task paths associated with various training tasks. Additionally, data storage 110 may also contain stored program logic that is executable by a processor of web server 102 (shown in FIG. 2) to carry out the various webserver functions described herein.

Figure 1B:
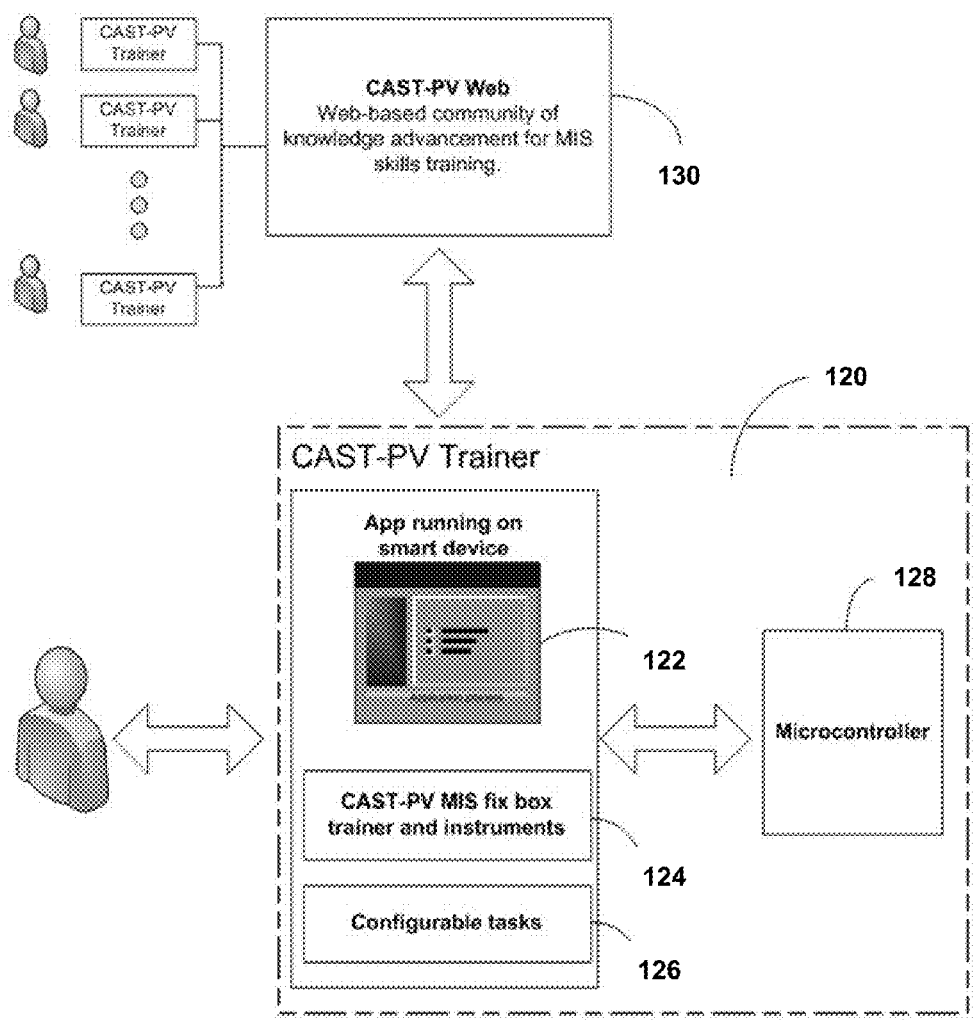
FIG. 1B illustrates a schematic of an example computer assisted surgical trainer and assessment system (CAST) that may be used in the network environment of FIG. 1A, according to an example embodiment.

FIG. 1B is a schematic illustrating an example surgical trainer and assessment system (CAST) system that may be used in the network environment of FIG. 1A. The CAST system 120 may include both hardware and software components. The software components may include both back-end and frontend aspects. The front-end aspects may include, for example, applications that are utilized to perform the various methods and functions described herein such as rendering comparisons or assessments regarding a performance of a trainee, and may be configured to run on a tablet device 122. The tablet device 122 may be the same or similar to client devices 108a-c described in FIG. 1A. The back-end software aspects may be configured to run in a microcontroller 128 associated with network environment 100. Microcontroller 128 may also serve as a control unit for sensors and actuators that may be installed in surgical instruments 122 that may be used to perform tasks. The configurable tasks 126 may be constructed utilizing, for example, building units included in the CAST-PV MIS fix box trainer and instruments 124 (discussed in more detail later in this disclosure) provided with the CAST-PV system 120.

The computer assisted surgical trainer portable version (CAST-PV) Web server 130 may be a webserver used to carry out some or all of the functions described herein. CAST-PV Web server 130 may be the same or similar to web server 200 shown in FIG. 2. CAST-PV Web server 130 may be configured to run a web application, similar to web-based applications 104a-c discussed in reference to FIG. 1A, that is configured to host a community of knowledge for MIS skills, and both trainers and trainees can upload and download different documentation and media, such as schematics to build training tasks, simulators, and videos.

In fact the CAST-PV web server 130 may be configured to continually record or receive new trainee data. The continuous recording of performance data of a trainee and membership function regeneration after deployment may allow the CAST-PV web server to maintain a community that is adaptable to its trainees' pace of improvement or to new, higher skilled users. CAST-PV Web server 130 may also be configured to run a web-application that performs assessments of given trainees as they perform training tasks. The data associated with CAST-PV Web server may, for example, be stored in data storage the same as or similar to data storage 110 of network environment 100, for example.

The elicitation process provides the key points needed to generate membership functions. Most of the time the information collected from different experts is averaged. It is also possible to give some weight to the expert's opinions according to their experience (e.g., number of performed procedures or working hours) or proven competency in the field. Membership function generation is straightforward and based on the information collected in the elicitation phase.

Application: We generated membership functions consisting of straight segments i.e., triangular and trapezoidal, also known as polygonal membership functions. Polygonal membership functions have several advantages as mentioned by Piegat:
1—A small amount of data is needed to define the membership function.
2—It is easy to modify the parameters (modal values) of membership functions on the basis of measured values of the input→output of a system
3—It is possible to obtain an input→output mapping which is a hyper surface consisting of linear segments.
4—Polygonal membership functions meet the condition of a partition of unity. The condition of a partition of unity restricts the sum of memberships of each element x from the universe of discourse to be equal to 1.

$$\sum_h \mu_{A_h}(x) \equiv 1, \quad \forall x \in X$$

Where: h—number of the fuzzy set.

Our elicitation method provided us with the transitional points where two membership functions intersect at the height of 0.5. We use these points to calculate the rest of the critical points needed to construct polygonal membership functions according to the following criteria:
1—We chose a triangular function over a trapezoidal when possible.
2—We encouraged vertical symmetry on non-outer membership functions.
3—We satisfied the condition of a partition of unity.

In this example, the identified transitional points were Beginner-Novice: 0.788045, Proficient-Beginner: 0.819006 and Expert-Proficient: 0.862335. We used these transitional points to generate the four membership functions that describe the Negative, Weak Positive, Moderate Positive and Strong Positive fuzzy sets.

We chose the pair of transitional points (tp1, tp2) with the smallest difference to generate the first membership function. In our example for the metric Continuity of Movement, these points are Beginner-Novice: 0.788045 and Proficient-Beginner: 0.819006. These two transitional points enclose the range of the most characteristic values of the beginner proficiency level i.e. the Weak Positive fuzzy set. Triangular curves depend on three parameters given by:

$$f(x; a, b, c) = \begin{cases} 0 & \text{for } x < a \\ \frac{x-a}{b-a} & \text{for } a \leq x < b \\ \frac{c-x}{c-b} & \text{for } b \leq x \leq c \\ 0 & \text{for } x > c \end{cases}$$

We defined the three parameters to generate a triangular membership functions these are the vertices a, b and c. Vertex b, which is the peak of the triangular function, is determined by the middle point mp between the two transitional points:

$$mp = \frac{tp2 - tp1}{2} + tp1$$

Where: $tp2 > tp1$

Vertex a is equivalent to the point where the line that passes through the points (mp, 1) and (tp1, 0.5) intersects with the membership degree of 0.

Vertex c is obtained in a similar way to vertex a by calculating the intersection with the membership degree equal to 0 of the line that passes through the points (mp, 1) and (tp2, 0.5).

We gave priority to triangular functions over trapezoidal. However, triangular functions impose restrictions over their neighboring membership functions if we want to satisfy the condition of a partition of unity, making it difficult to represent all of the fuzzy sets as triangular shapes.

Continuing with our example using the metric Continuity of Movement, the triangular membership function describing the Weak Positive fuzzy set establishes restrictions over its neighboring membership functions. Therefore, trapezoidal functions are required to make the neighboring membership functions corresponding to Negative and Moderate Positive fuzzy sets to have a membership degree of 0 at the point where the already defined Weak Positive fuzzy set has a membership degree of 1 (i.e., at its middle point mp) as well as a membership degree of 0.5 where the transitional points have been identified.

Trapezoidal curves depend on four parameters and are given by:

$$f(x; a, b, c, d) = \begin{cases} 0 & \text{for } x < a \\ \frac{x-a}{b-a} & \text{for } a \leq x < b \\ 1 & \text{for } b \leq x \leq c \\ \frac{d-x}{d-c} & \text{for } c \leq x < d \\ 0 & \text{for } d \leq x \end{cases}$$

At this point, we already know one out of four parameters required to generate the trapezoidal membership function corresponding to the Negative fuzzy set. We know that the vertex d of the Negative fuzzy set should be equal to vertex b of the Weak Positive fuzzy set (i.e., 0.8034) to satisfy the condition of partition of unity, making the maximum membership point for one fuzzy set (Weak Positive) represent the minimum membership point of its neighbor (Negative). Vertex c of the Negative membership function is equivalent to vertex a of the triangular function of the Weak Positive fuzzy set (i.e. 0.7725). Finally, we gave the same value to the vertices a and b because the Negative fuzzy set corresponds to the left outside membership function of the continuity of movement variable. This means it has only one neighbor to its right side (Weak Positive). We gave a and b the minimum value shown in our samples i.e., 0.5761.

We encourage vertical symmetry of trapezoidal membership functions when they are not right or left outside membership functions such as the Moderate Positive. As in previous examples vertex a and b can be defined from the neighboring set Weak Positive. The middle point mp between the two transitional points that enclose the highest membership degrees of the Moderate Positive is calculated using equation E01. These three points define a half of a symmetrical trapezoid from where the remaining vertex can be easily deduced.

We design a hand-eye coordination task consisting of a tray with 5 labeled pegs and a starting point. The trainee has to touch the tip of each peg with the tip of a 5 mm×33 mm MIS spatula with an unlimited time in the following order: start→0→1→0→2→0→3→0→4

CAST emits a sound when the corresponding target has been touched by the spatula's tip. This auditory aid is used by the trainee to recognize when a target has been reached and therefore to continue executing the next movement in the sequence.

We used MATLAB Fuzzy Logic Toolbox 2 for the implementation of the scoring system. Fuzzy Logic Tool Box 2 is a collection of functions built in the MATIAB numeric computing environment that provides tools to create and edit fuzzy inference systems.

The CAST Scoring System is a five input, one output Mamdani fuzzy model with 20 rules developed with the Matlab Fuzzy Logic Toolbox 2. The inference process is performed automatically by MATLAB. However, this had to be programmed with the following specifications shown in Table T01.

TABLE T01

Specifications underlying the CAST assessment system.

| | |
|---|---|
| Fuzzy inference system | Mamdani |
| Implication method | Min |
| Aggregation method | Sum |
| Defuzzification method | Centroid |
| Membership functions | Triangular-trapezoidal [0,1] |

MAMDANI Fuzzy Inference System: Considers a fuzzy output. In the assessment model the outputs are fuzzy sets representing proficiency levels: Novice, Beginner, Proficient and Expert.

MIN Implication Method: In this method, the output membership function is truncated at the height corresponding to the rule's antecedent computed degree.

SUM Aggregation Method: In this method, the aggregated output fuzzy subset is constructed by taking the pointwise sum over all of the fuzzy subsets assigned to the output variable by the inference rules.

CENTROID Defuzzification Method: In this method, the crisp value of the output variable is computed by finding the center of gravity of a continuous aggregated fuzzy set. The centroid $y_i$ of B is given by $$y' = \frac{\int_s y_i \mu_B(y) dy}{\int_s \mu_B(y) dy} \quad (E01)$$

A Mamdani model lies at the core of the CAST scoring system. The Mamdani type is one of the most frequently used fuzzy logic structures, characterized by handling rules with fuzzy consequents. As opposed to other fuzzy models, such as Sugeno type, which handles crisp outputs, Mamdani systems demand processing a greater computational load to defuzzify consequents. Nevertheless, working with fuzzy consequents facilitates eliciting expert knowledge in a more transparent and intuitive manner. Experts do not have to provide crisp values or a mathematical equation to describe outputs for Mamdani systems.

CAST fuzzy system features membership function and output sets with triangular and trapezoidal forms with a maximum degree of membership of 1 and a minimum of 0. Rules were designed by matching the fuzzy terms obtained in each variable's semantic decomposition (Negative, Weak Positive, Moderate Positive and Strong Positive) with their corresponding proficiency level (Novice, Beginner, Proficient and Expert). The rules' antecedents have one proposition formed by a variable (performance metric) and one fuzzy term. The rules' consequents have one proposition formed by a variable (proficiency level) and one fuzzy term. A single-input, single-output rule design was preferred because of the difficulty experienced while trying to elicit rules from an expert surgeon that involved more than one proposition in their antecedent and/or consequent. The expert's struggle to articulate rules with more than one antecedent and consequent indicates that the judgment process occurs considering one proposition at the time and this concept is captured in our scoring system. The system's rulebase consists of a total of v×m rules where v is the number of variables, and m is the number of proficiency levels. For example, for the variable Continuity of Movement we have the following set of rules:

If Continuity of Movement is strong positive then Proficiency level is expert.

If Continuity of Movement is moderate positive then Proficiency level is proficient.

If Continuity of Movement is weak positive then Proficiency level is beginner.

If Continuity of Movement is negative then Proficiency level is novice.

Each rule has an associated weight that can take values from 0 to 1. The weight determines the rule's impact on the final score. For the hand-eye coordination task, each rule was provided with the same weight. The rule's weight is related to the variable's degree of relevance. This degree of relevance was determined by an expert surgeon and depends on the task being evaluated since different tasks might require different abilities at different levels.

The fuzzy output is composed by all the possible consequents of the rules in our rule base i.e., the four proficiency levels Novice, Beginner, Proficient and Expert. We distributed the membership functions evenly on a range of values going from −33.33 to 133.32. We followed the same criteria for constructing the membership functions used in the construction of the input fuzzy sets.

Although the fuzzy output sets range from −33.33 to 133.32, the maximum score a subject might achieve is 99.99 and the minimum is 0. This is due to the centroid defuzzification method.

Figure 1C:
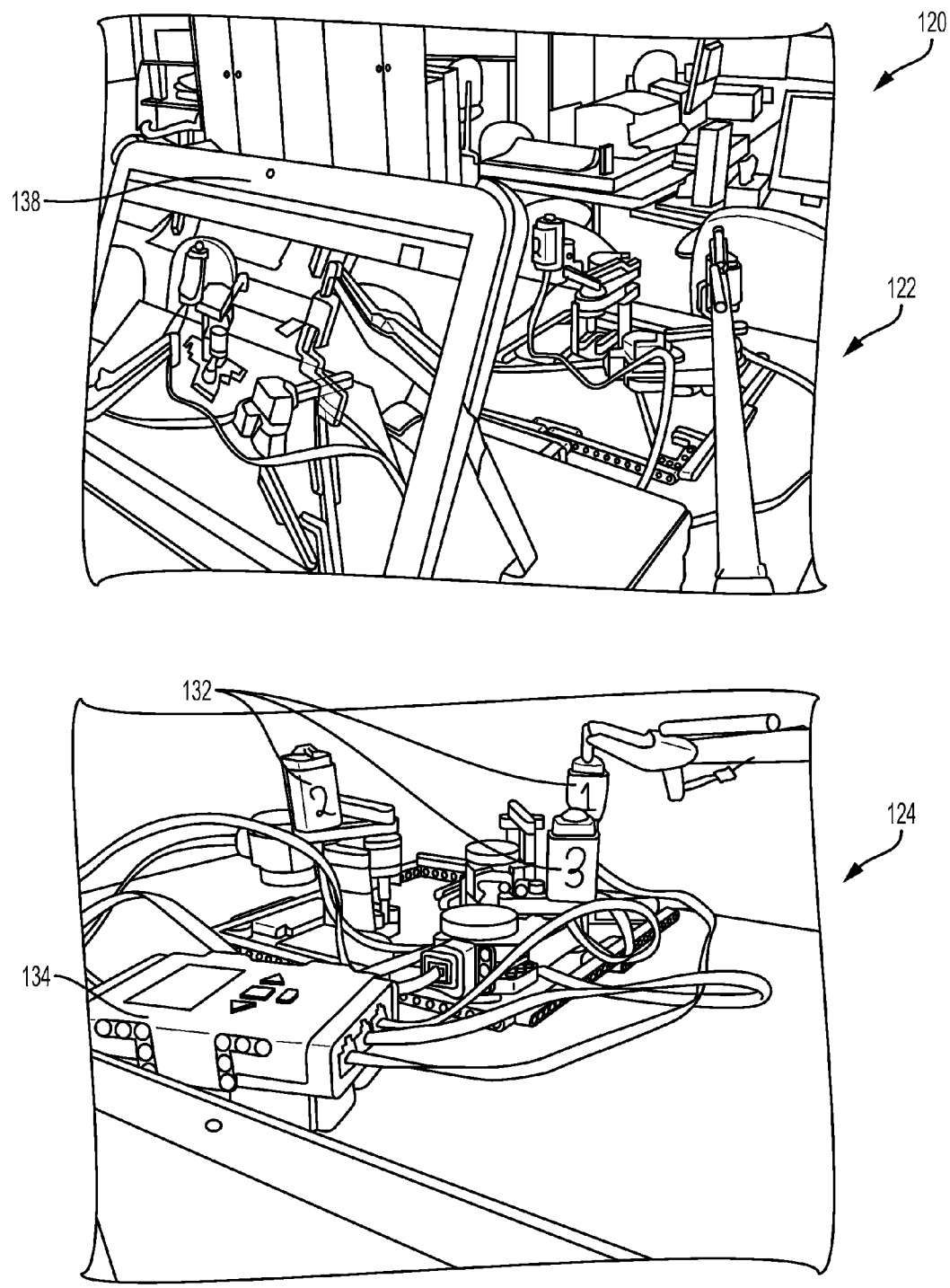
FIG. 1C illustrates the CAST system of FIG. 1B in practice, according to an example embodiment.

FIG. 1C illustrates aspects the CAST system 120 in practice. In FIG. 1C, CAST system 120 may be built of Lego® Mindstorms and a tablet running an application that serves as the platform for running the applications that provide training for laparoscopic surgery. However, FIG. 1C is an example configuration only, and is not intended to be limiting. CAST system 120 may be built of things other than Legos® so long as the building components are capable of carrying out the tasks described herein. In FIG. 1C, CAST system 120 is shown from two different perspectives, 122 and 124.

Note that, in some implementations, users may not observe see the Lego® Mindstorm components directly: they must rely on, for example a webcam 138 of the tablet device. This challenges, for example, hand-eye coordination task and may provide fidelity to the task since users must perform on a 2D representation of a 3D space.

Figure 2A:
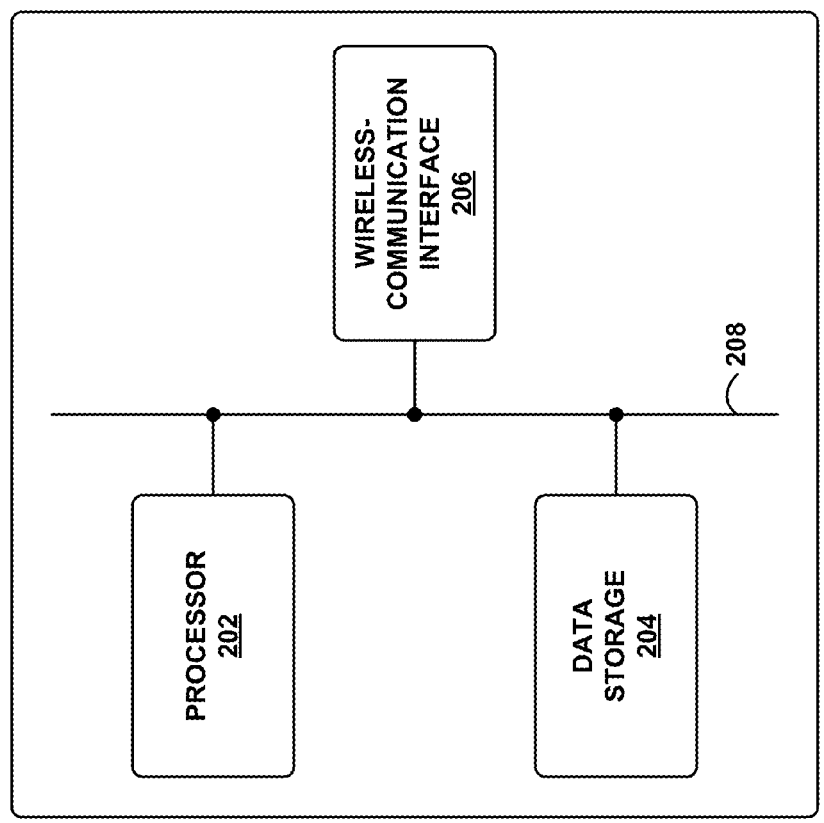
FIG. 2A illustrates a simplified embodiment of an example web server that may be used in the environment of FIG. 1A and with the CAST system of FIG. 1B, according to an example embodiment.

FIG. 2A is a simplified block diagram depicting an example web server 200 that may be configured to operate in accordance with various embodiments. For example, web server 200 may be used as CAST-PV Web server 130 in network environment 100. Web server 200 may be similar or identical to web server 102 discussed in reference to FIG. 1A. Web Server 200 may be a tablet computer, personal computer, laptop computer, or some other type of device that communicates with other communication devices via point-to-point links or via a network, such as Network 106 shown in FIG. 1A. In a basic configuration, web server 200 may include one or more processors 202, data storage 204, and a wireless communication interface 206. A memory bus 208 can be used for communicating among the processor 202, data storage 204, and the wireless communication interface 206.

Processor 202 may include one or more CPUs, such as one or more general purpose processors and/or one or more dedicated processors (e.g., application specific integrated circuits (ASICs) or digital signal processors (DSPs), etc.). Data storage 204, in turn, may comprise volatile and/or non-volatile memory and can be integrated in whole or in part with processor 202. Data storage 204 may hold program instructions executable by processor 202, and data that is manipulated by these instructions, to carry out various logic functions described herein. Alternatively, the logic functions can be defined by hardware, firmware, and/or any combination of hardware, firmware, and software.

Wireless-communication interface 206 may take the form of a wireless connection, perhaps operating according to IEEE 802.11 or any other protocol or protocols used to communicate with other communication devices or a network. Other forms of physical layer connections and other types of standard or proprietary communication protocols may be used over wireless communication interface 206. Furthermore, wireless communication interface 206 may comprise multiple physical or logical network interfaces, each capable of operating according to the same or different protocols. In some embodiments, the web server may additionally or alternatively include a wired-communication interface (not shown).

In addition to the components and functions discussed above, web server 200 may support additional components and functions, including components and functions used to perform any of the methods described herein.

Figure 2B:
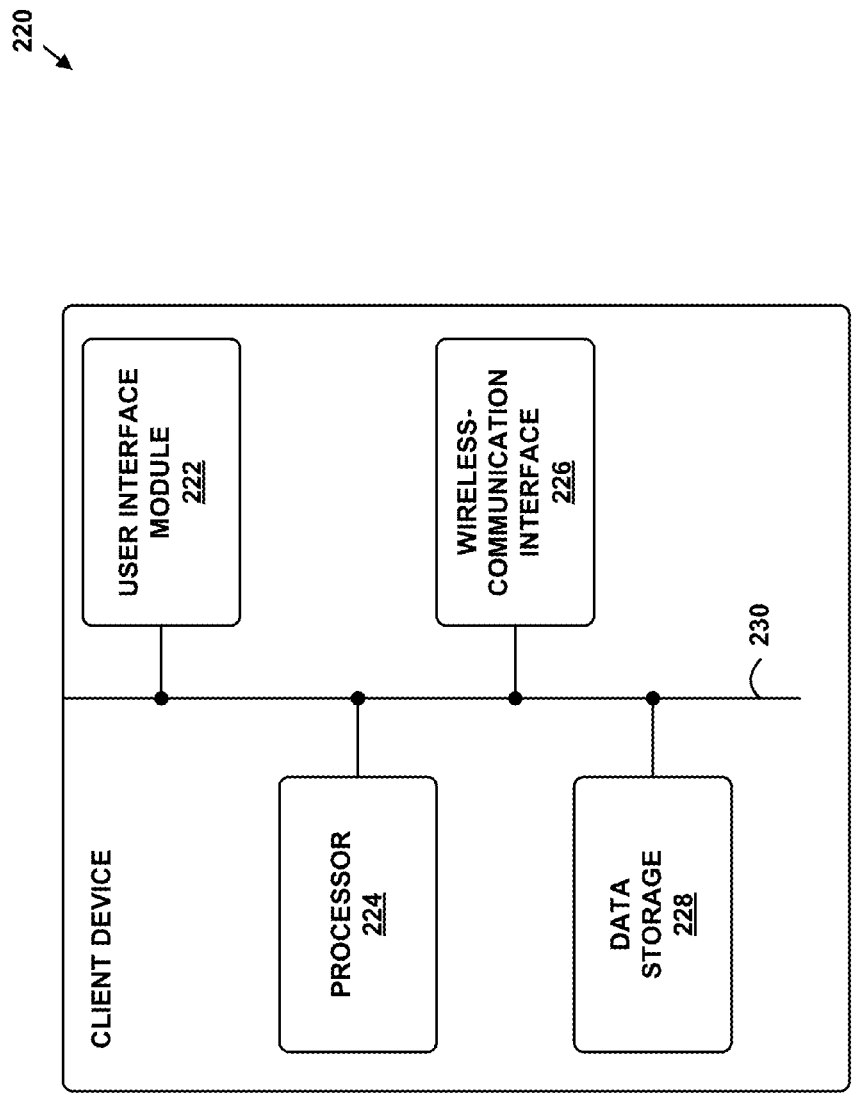
FIG. 2B illustrates a simplified embodiment of an example client device that may be used in the environment of FIG. 1A and with the CAST system of FIG. 1B, according to an example embodiment.

FIG. 2B is a simplified block diagram depicting an example client device 220 that may be configured to operate in accordance with various embodiments. Client device 220 may be similar or identical to client devices 108a-c discussed in reference to FIG. 1 and may be used as tablet device 122 of CAST system 120, for example.

The client device 220 may include a user interface module 222, a wireless-communication interface 226, one or more processors 224, and data storage 228, all of which may be linked together via a system bus, network, or other connection mechanism 230. The user interface module 222 may be operable to send data to and/or receive data from external user input/output devices. For example, the user interface module 222 may be configured to send/receive data to/from user input devices such as a keyboard, a keypad, a touch screen, a computer mouse, a track ball, a joystick, and/or other similar devices, now known or later developed. The user interface module 222 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 222 may also be configured to generate audible output(s), such as a speaker, speaker jack, audio output port, audio output device, earphones, and/or other similar devices, now known or later developed. The wireless-communications interface module 222 may be configurable to communicate via a network, such as the Network 106 shown in FIG. 1A.

Wireless-communication interface 226 may take the form of a wireless connection, perhaps operating according to IEEE 802.11 or any other protocol or protocols used to communicate with other communication devices or a network. Other forms of physical layer connections and other types of standard or proprietary communication protocols may be used over wireless communication interface 226. Furthermore, wireless communication interface 226 may comprise multiple physical or logical network interfaces, each capable of operating according to the same or different protocols. In some embodiments, the client device 220 may additionally or alternatively include a wired-communication interface (not shown).

The data storage 228 may include computer-readable program instructions and perhaps additional data. In some embodiments, the storage 204 may additionally include storage required to perform at least part of the herein-described techniques and/or at least part of the functionality of the herein-described devices and networks.

The one or more processors 224 may include one or more general purpose processors (e.g., microprocessors manufactured by Intel or Advanced Micro Devices) and/or one or more special purpose processors (e.g., digital signal processors, application specific integrated circuits, etc.). The one or more processors 224 may be configured to execute computer-readable program instructions that are contained in the data storage 228 and/or other instructions as described herein. The data storage 228 may include one or more computer-readable storage media that can be read or accessed by at least one of the processors 224. The one or more computer-readable storage media may include volatile and/or non-volatile storage components, such as optical, magnetic, organic or other memory or disc storage, which can be integrated in whole or in part with at least one of the processors 224. In some embodiments, the data storage 228 may be implemented using a single physical device (e.g., one optical, magnetic, organic or other memory or disc storage unit), while in other embodiments, the data storage 228 may be implemented using two or more physical devices.

C. Example Methods

Figure 3A:
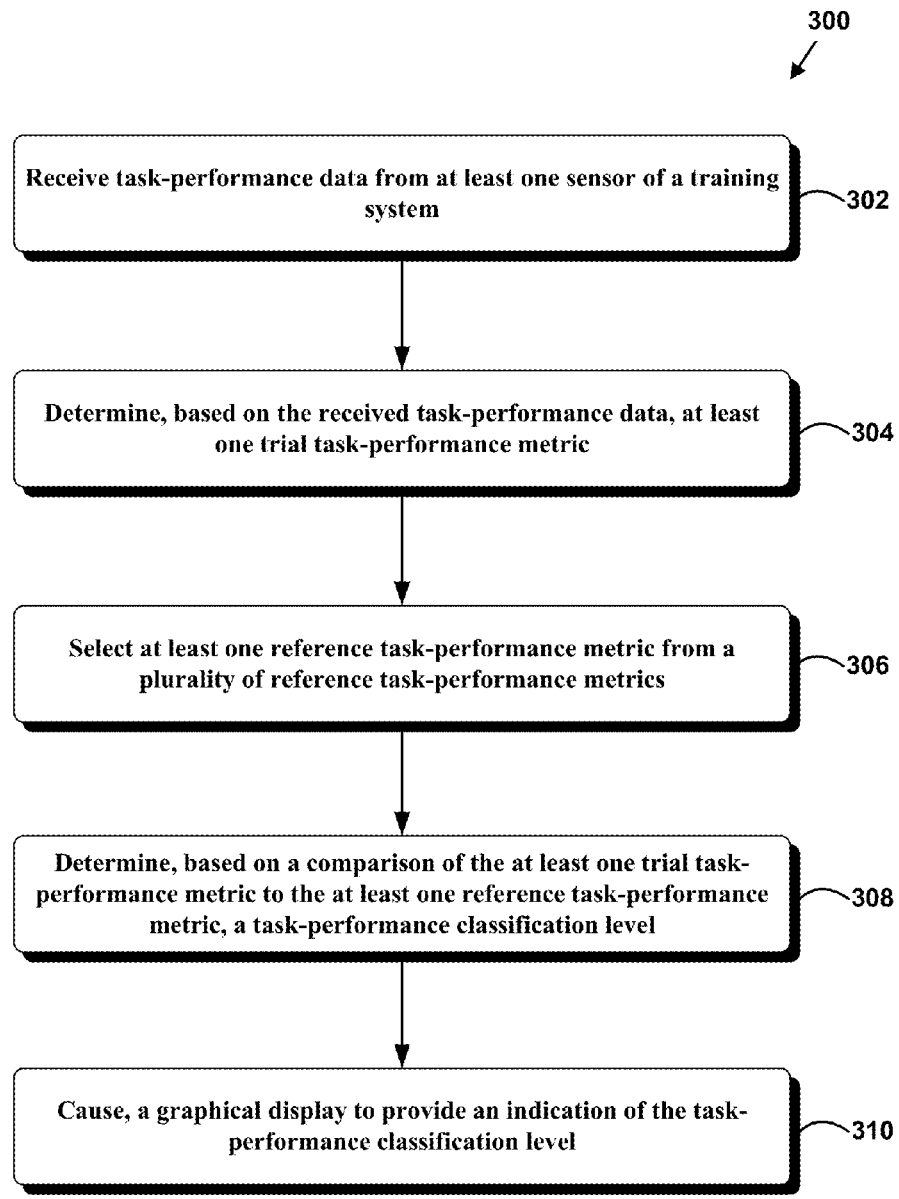
FIG. 3A illustrates a flow chart for evaluating surgical procedures, according to an example embodiment.

FIG. 3A illustrates a method 300 that may be carried out using the CAST system 120 in network environment 100, described above with regard to FIGS. 1A-1C, for example. Method 300 may effectively train a user to perform MIS techniques, according to an example embodiment. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium or memory, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device, such as the one described in reference to FIG. 5.

First, at block 302, the method includes receive task-performance data from at least one sensor of a training system. The training system may be the same or similar to the training system discussed above with regard to FIGS. 1B and 1C, for example. Along with the at least one sensor, the training system may include at least one block component and at least one actuator. The sensors may include touch sensors, accelerometers, light sensors, infrared sensors, ultrasonic sensors, compass sensors, radio frequency sensors, and motion tracking sensors and the actuators may include such stepper motors and servomotors. Among other examples, such sensors and actuators may be installed in surgical instruments required to perform tasks, and the configurable tasks may be constructed utilizing the block components. The block components may comprise a connector, a brick, a rod, or a gear that help provide structure to the training task. In one example, Lego® Mindstroms may be used to provide structure to the training task, however any such construction blocks, toys, gears, or rods may be used.

Taken together, the sensor, block component, and actuator may be used to represent training task that may be performed by a trainee of the system. For example, the sensor, block component, and actuator may be configured in a manner that requires a user to perform certain hand-eye coordination tasks or certain hand movements while holding or using a surgical instrument. More specifically, trainees and trainers may use the sensor, actuators, and block components to build a diversity of tasks, which aim to improve MIS skills such as hand-eye coordination, ambidexterity, space perception, instrument handling, precision of motion, and economy of movements. The actuators may provide the dynamic elements of a training task comprising moving targets and obstacles in the path of a trainee to accomplish a subtask. The sensors may be configured to gather data regarding movement of the trainee while performing a task.

In one example, the sensors may be connected by means of a Lego® Mindstorm Brick 134 as shown in FIG. 1C. In this example, trainees may use surgical instruments to navigate from each checkpoint 132, clicking the respective sensor labelled 1, 2, and 3. Throughout the performance of the task, a position of the sensors may change, for example, to 90°, 45° and 90°, respectively by rotating the servo motors 134.

Figure 4A:
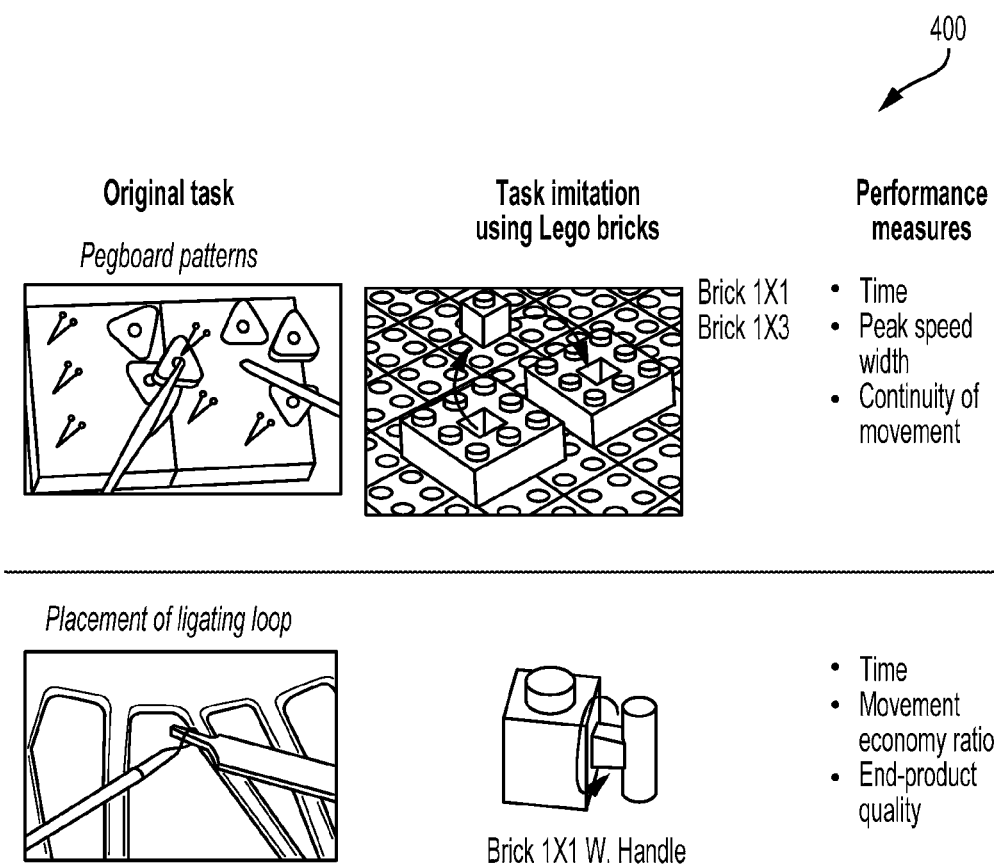
FIGS. 4A-4B illustrate example surgical tasks, according to example embodiments.
Figure 4B:
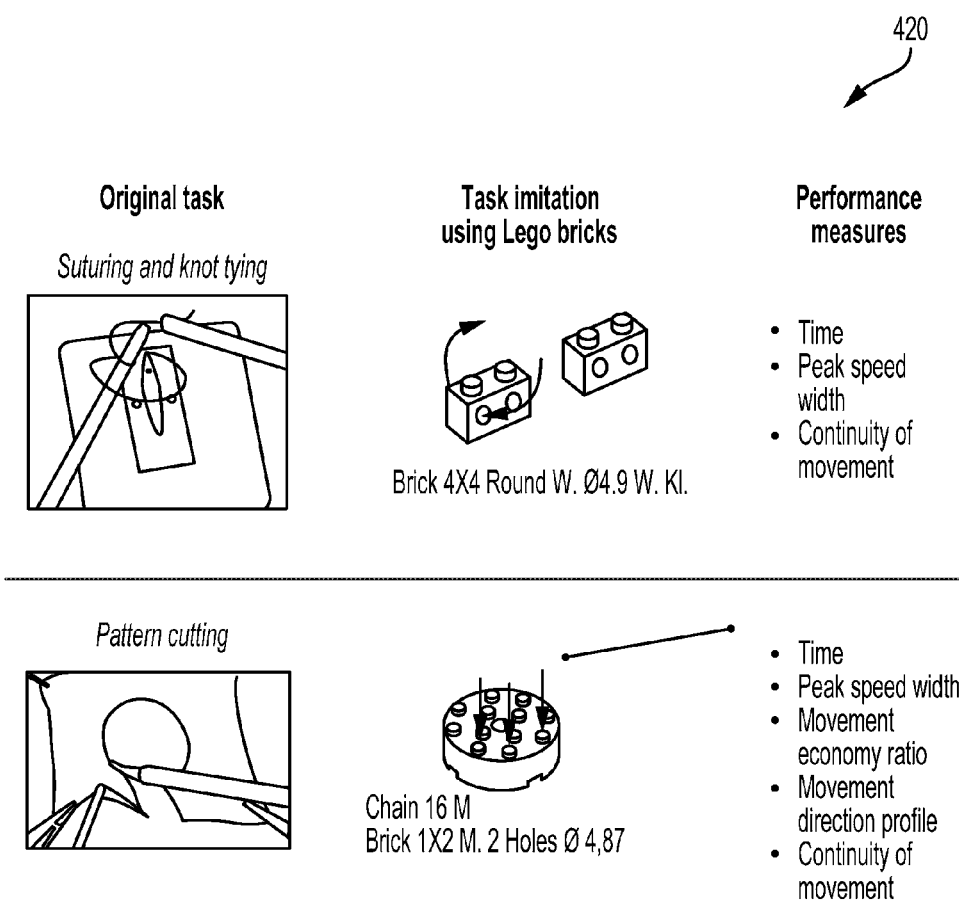

FIGS. 4A and 4B illustrate example surgical tasks that may, for example, be constructed using the sensors, actuators, and blocks.

In FIGS. 4A and 4B, "Original task" represents a particular MIS technique that may be constructed as a training task in CAST system 120 using Lego® bricks. For example, as shown in FIGS. 4A and 4B, example tasks may include pegboard patterns, placement of ligating loop, suturing and knot tying, and/or pattern cutting. Note, FIGS. 4A and 4B are meant to be examples only, and many different tasks may be constructed using the components of CAST system 120.

The task-performance data may include data that is obtained during the performance of the task, and may include movement data associated with the sensors, actuators, and block components that define the training task. In some examples, the task-performance data may include video data of the performance of the training task. In other examples, the task-performance data may include measurement information that, for example, defines translation, rotation, or speed measurements associated with the performance of the training task. Such information may be obtained, for example, using the sensors of the CAST system 120. Other data may be included in the task-performance data as well. In other words, the task-movement data may include any data relevant to measuring the performance of a task and may take any format capable of organizing and storing relevant task-performance data, may encompass various types of data, may be of various file formats, and may be stored to various mediums, whether those types of data, file formats, and mediums are known or have yet to be developed. In some examples, the CAST system may utilize a tablet that has an embedded camera, which allows trainees to view their movements while performing a task (see FIG. 1C).

Once the task-performance data has been received, at block 304, the method includes determine, based on the task-performance data, at least one trial task-performance metric. The task-performance metric may be any metric that facilitates the assessment of performed tasks (e.g., laparoscopic surgical tasks). The task-performance metric may be determined, for example, by interviewing MIS experts, or based on previously determined metrics used to measure and assess MIS surgical tasks. The metrics may be provided to CAST Web server 130 and stored in a database, for example. The task-performance metric may include a time period, a movement length, a movement direction, a peak speed width, or a continuity of movement, among other examples. The time period task-performance metric may define the total time taken to perform a given task; the movement length task-performance metric may define the total movement length used to perform the task; and the movement direction task-performance metric may quantify the extent that an instrument used to perform the task deviates in moving from, for example, target A to target B in the task, among other examples.

The peak speed task-performance metric may define the movement speed described by a laparoscopic instrument that when being moved between two targets, for example by an experienced surgeon, goes rapidly from rest to a maximum speed value, maintains that maximum (or a close enough) value until the instrument is near to the target, and then returns to rest at the target. Peak speed width may be calculated by dividing a peak amplitude of a speed wave (that defines the movement) by two and calculating the ratio of the resulting areas. The peak speed width metric value depends on the horizontal symmetry of the wave; waves closer to a trapezoidal shape reflect better movement control over the instrument than jitter shapes.

The continuity of movement task-performance metric may define a measurement of how continuous movement is. The continuity of movement task-performance metric may be calculated by eliminating, recursively, graph troughs that define a speed, to obtain a modified graph, and then calculating the ratio of both areas under the curves original speed graph.

Note, the above noted metrics are examples only and other metrics may be used to assess a performance of the training task.

Once the task-performance metric has been determined, the method proceeds to block 306. At block 306, method 300 includes select at least one reference task-performance metric from a plurality of reference-task metrics. The reference-task performance metric may be the same or similar to the trial task-performance metric discussed with regard to block 304. The reference-task performance metric may be a metric that was obtained by a different trainee during an earlier performance of the training task. The different trainee may, for example, be a part of the MIS community, and may have previously uploaded task-performance metrics to the CAST-PV Web server 130, for example.

In other examples, the reference task-performance metric may be a metric associated with a different trainee who happens to be performing the same training task at the same time as the trainee of step 302. In further examples, the task performance metric may be provided by expert surgeons who desire to provide example techniques associated with the training task. Based on the metrics provided, to CAST-PV Web server 130, for example, an appropriate metric may be selected. The metric may be selected for example, based on a focus of the training task. If, for example, a given trainee is focusing on continuity of movement, various continuity of movement task-performance metrics (and their respective values) may be selected for comparison. In other examples, if a given trainee desires a more holistic assessment, various different task-performance metrics may be selected.

Next, at block 308, method 300 includes determine, based on a comparison of the trial task-performance metric to the reference task-performance metric, a task-performance classification level. The task-performance classification level may be a level that defines the proficiency of a user performing the training task. The classification levels may, for example, be determined by experts in the field of laparoscopic surgery. Example classifications may include novice, beginner, proficient, and expert. Other classifications may be used as well.

To make the comparison of the trial-task performance metric and the reference task-performance metric, fuzzy logic may be used. Fuzzy logic is a form of many-valued logic or probabilistic logic that deals with reasoning that is approximate rather than fixed and exact. Fuzzy logic uses fuzzy logic variables that may have a truth value that ranges in degree between 0 and 1, and fuzzy logic has been extended to handle the concept of partial truth, where the truth value may range between completely true and completely false. Furthermore, when linguistic variables are used, these degrees may be managed by specific functions.

For example, a range of values corresponding to a valid performance metric may be sorted from less desirable value to most desirable value and divided into four crisp intervals: Negative, Weak Positive, Moderate Positive, and Strong Positive. If proficiency levels such as Novice, Beginner, Proficient, and Expert are matched with the intervals that characterize them, Negative, Weak Positive, Moderate Positive and Strong Positive, respectively, then values may exist where it is not possible to accurately define whether they are characteristic of one proficiency level or another. Accordingly, because there is a lack of personal and interpersonal agreement between expert surgeons on defining proficiency levels in laparoscopy surgery, fuzzy logic may be used to reconcile the differences.

For example, fuzzy sets may be used to categorize those values that fall within the boundary areas between two neighboring intervals characteristic of different classification levels. In other words, trainees may exist with performances containing metrics' values (e.g., the movement speed task-performance metric) characteristic of two neighboring classification or proficiency levels at a certain degree, e.g., a membership degree of 0.5 to the Beginner proficiency level and a membership degree of 0.5 to the Proficient proficiency level. Such analysis (comparison) may be made, for example using CAST-PV Web server 130, and may be stored in a database similar to or the same as data storage 110.

In the CAST system, fuzzy membership functions may be derived through the location of transitional points between proficiency levels (received from the CAST system web-based community) defined as percentages. The locations of the transitional points change according to the number of samples used for the generation of membership functions. The greater the number and diversity of the samples, the more accurate the system may be. To offset the subjectivity inherited from relying solely on the data of the subjects used during the design phase of the system, the samples of new subjects that exceed a limit of a metric range (i.e., its maximum or minimum value registered in the system) should be considered for its integration with the system knowledge base, and therefore, for the recalculation of new transitional points.

Once the classification level has been determined, at block 310, the method includes causing a graphical display to provide an indication of the task-performance classification level. The graphical display may, for example, be a graphical display of the client device described with reference to FIG. 2B. The indication of the task-performance classification level may be qualitative and quantitative performance data indicative of a performance of the training task. The quantitative and qualitative performance data may be determined from the task-performance metrics and based on the comparison made at block 308.

Figure 3B:
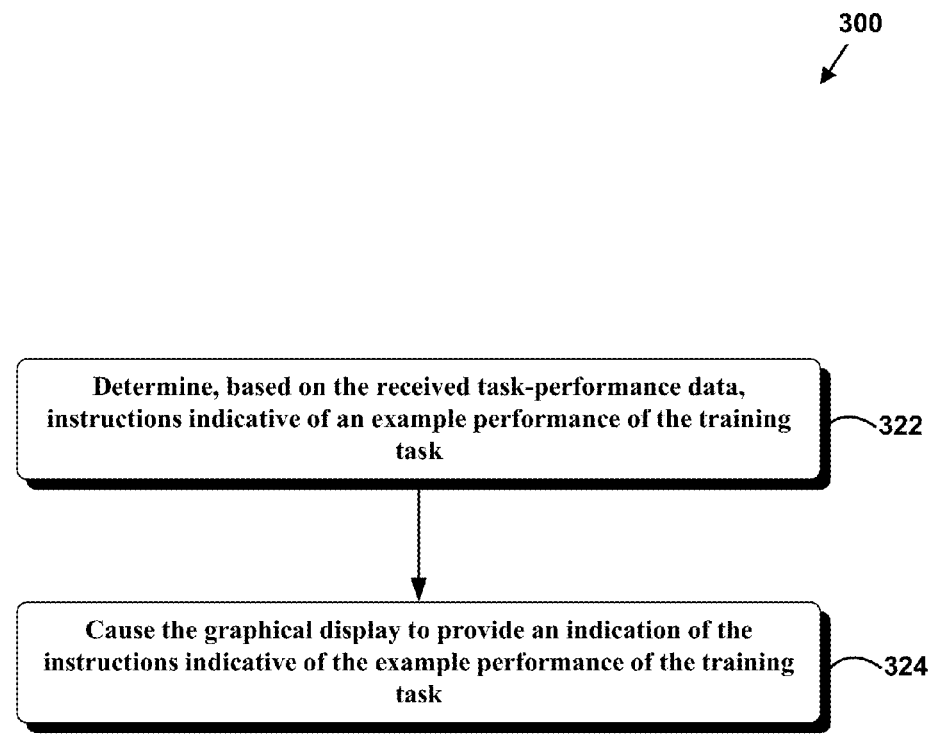
FIG. 3B illustrates another flow chart for evaluating surgical procedures, according to an example embodiment.

FIG. 3B illustrates another example embodiment of additional or alternative steps of method 300 shown in FIG. 3A. In FIG. 3B, method 300 additionally includes steps 322-324. Initially, at block 322, method 300 includes determine based on the received task-performance data, instructions indicative of an example performance of the training task. In some cases, the instructions indicative of an example performance of the training task may include instructions for performing the task using what is determined to be a minimum movement length while performing the task, or instructions for performing the task in an efficient manner, or instructions for performing the task while avoiding particular areas in the three-dimensional surgical space. For example, referring back to FIG. 4B, the example performance may include an example of how to perform the suture and knot tying task using a minimum movement length.

In another example, an optimal motion planning method called optMIS may be used to determine the instructions indicative of an example. The instructions may be provided, for example, in the form of shortest, collision-free trajectories for instrument movements used to perform the suture and knot tying task. The motion planning method may consist of two sequential stages, such as a shortest path planning stage and time-optimal trajectory planning stage. At the first stage, the workspace may be represented as a mesh of tetrahedrons based on the proposed Delaunay tetrahedralization algorithm, and the shortest curves may be constructed through the data points of a mesh. The obtained curves may then be used to interpolate the positions of instruments within the range of targets. At the second stage of the method, an elitist genetic algorithm may be applied to find the periods of time when the data points of the shortest curves should be reached in order to avoid collisions between instruments. The optimal path concept will now be discussed in more detail below.

The Delaunay tetrahedralization algorithm is used to split obstacles into tetrahedrons and to derive the free space so that all tetrahedrons located in this free space comprise the search space of the optimal motion planning method. Dijkstra's algorithm defines tetrahedrons that correspond to promising areas in the space. An enumerative combinatorics technique exhaustively explores the selected areas of interest to provide more accurate solution to the problem. Cubic spline methodology helps in constructing realistic smooth paths to prevent zig-zag movements of the instruments. The explorational power of population based heuristics, such as elitist genetic algorithm, is used to quickly find the near-optimal average speed for instrument movements in order to prevent collisions between them.

As noted above, the optMIS method consists of the following sequential stages:
1. Shortest path planning: for each laparoscopic instrument find a set of configurations $S_i \in C_{free}$ corresponding to a shortest path.
2. Time-optimal trajectory planning: assign time period t to each configuration $S_i \in C_{free}$ in order to avoid collisions between the instruments.

Shortest Path Planning

The first step toward defining the shortest path $S_i$ is to represent the workspace as a mesh of tetrahedrons. For this, we may apply the Delaunay tetrahedralization algorithm to each convex obstacle $B_j$. The union of $DT_{obst}$ simplicial complexes that decompose the concave hull of the obstacle points is obtained as follows:

$$DT_{obst} = \bigcup_{j=1}^{J} DT_j$$

where $DT_j$ is a simplicial complex that represents the j-th obstacle. Then, a simplicial complex $DT_{free}$ that corresponds to the free space $C_{free}$ is defined by decomposing the workspace W into a mesh of tetrahedrons DT and subtracting $DT_{obst}$ from it:

$$DT_{free} = DT - DT_{obst}$$

The vertices of tetrahedrons DT are generated randomly using a uniform distribution. In contrast to the methods of alpha shapes, which require defining global or local threshold alpha, this approach provides more flexibility in modeling complex obstacle spaces and is independent of additional parameters. Once the workspace has been decomposed, Dijkstra's algorithm is applied to find the shortest continuous channel of tetrahedrons $Q=\{q_i^1, \ldots, q_i^N\} \in DT_{free}$, where N is a number of tetrahedrons. The length of the channel L(Q) is calculated as the sum of distances between centroids of the tetrahedrons. A set of configurations $S_i=\{s_i^1, \ldots, s_i^N\} \in Q$ corresponding to the shortest path is built to satisfy the following constraints $\Omega$ for $i=\overline{1,I}$ and $n=\overline{1,N}$:

$$\Omega: \begin{cases} r_{i(s_i^n)} \cap B = \emptyset \\ d_i^n \in [a_i^{min}, a_i^{max}] \\ B_i^n \in [B_i^{min}, B_i^{max}] \\ \gamma_i^n \in [\gamma_i^{min}, \gamma_i^{max}] \end{cases}$$

The first constraint eliminates collisions with obstacles when the instrument $r_i$ is at $s_i^n$, with the provision that the instrument be geometrically represented as a cylinder with a radius $\rho_i$. The second, third, and fourth constraints are used to check whether pitch and yaw angles as well as the insertion depth stay within the range between the lower and upper bounds. As a result, our Dijkstra's algorithm always provides the shortest feasible channel without the need to solve more time-consuming k-shortest paths problem.

The next step is to construct the shortest curve through the data points corresponding to $S_i=\{s | s \in \Omega\}$. An enumerative combinatorics technique is used to evaluate all combinations of the data points and find the one that gives the minimal length of the curve. We use the cubic spline methodology to fit third-order polynomials between the data points providing that the curve obtained is continuous and smooth, i.e.:

$$F_i(x) = \{f_i^1(x), \ldots, f_i^{(N-1)}(x)\}$$

$$f_i^n(x) = a_i^n(x-x_i^n)^3 + b_i^n(x-x_i^n)^2 + c_i^n(x-x_i^n) + d_i^n$$

$$x_n \leq x \leq x_{n+1}$$

where Fi(x) is a piecewise function, $f_i^n(x)$ is a cubic polynomial; $x \in R^3$ is a position in 3D Cartesian space a, b, c and d are coefficients; N' is the number of data points that satisfy the constraints $\Omega$ and N'≤N.

The obtained curves are then used to interpolate the positions of laparoscopic instruments within the range of targets.

Time-Optimal Trajectory Planning

In this stage, a time law is specified on shortest paths Fi(x) in order to avoid collisions between instruments. The stage consists of the following two steps:
1. Define the configurations at which laparoscopic instruments intersect;
2. Assign a time value to each intersection configuration in order to prevent collisions between the instruments.

In order to detect the intersection points of the instruments, we represent the configuration spaces Ci in terms of spheres with radii equal to $\gamma_i^{max}$. The collision area is composed of spherical caps that are found analytically by combining the equations of spheres. Bounding points are defined for the intervals of shortest paths that belong to the collision area. These points are then assigned to the intersection configurations:

$$S_i^{int} = \{s_i^1, \ldots, s_i^L\} \in S_i$$

where L is a number of intersections.

Once the first step is completed, an elitist genetic algorithm (GA) is applied to find the periods of time t when the configurations $s_i \in S_i^{int}$ should be reached. Formally the algorithm can be described as follows.

Let $P^r=\{p^1, \ldots, p_z\}$ be a population at generation that consists of Z chromosomes. Each chromosome in P is represented by a binary string such as:

$$p^z = (p_{m-1}^z p_{m-2}^z \ldots p_1^z p_0^z) \in \{0,1\}^m$$

where z is the index of a string; m is a length of a string; $p_m^z$ is a gene at locus m. Binary strings $p_m^z$ are used to encode time values $t \in [0,T]$ for $s_i^l(t) \in S_i^{int}, l=\overline{1,I}$, and $\overline{1,I}$. The fitness function $Fit^z$ operates to minimize a weighted sum of the following components:
(a) $Fit_1^z$ 1: The time delay between placing multiple laparoscopic instruments at each intersection point.
(b) $F_2^z$ 2: The rate by which the magnitude of velocity is changed along the paths.
(c) $Fit_3^z$ 3: The total time T during which all goal positions are accessed.

The penalty function is applied to infeasible chromosomes in order to decrease their survival probability. A chromosome $p^z$ is considered to be infeasible if the time delay $Fit_1^z$ is lower than a predefined lower bound $Fit_1^{min}$.

The performance of the elitist GA algorithm is controlled by the genetic operator G that implements iterative transitions between populations according to:

$$p^{(\tau+1)} \sim G(P^\tau)$$

where ~ is an equivalence relation. This operator is composed of four sub-operators, namely the stochastic universal sampling ($A_s$), the uniform crossover ($A_c$), the mutation ($A_m$) and the reproduction ($A_r$) so that:

$$G = A_s \circ A_c \circ A_m \circ A_r$$

External archiving is introduced as the elitist mechanism to avoid the loss of the best solution during the evolution process. The external archive is updated by a new best solution $Fit^z$ if its fitness value is lower than the value of current best solution $Fit^{min}$. The elitist GA is automatically terminated once the number d* of generations with a constant best solution is equal to the predefined value d* within some threshold.

The GA outputs time values that we further use to estimate the instruments' average speed at particular segments of the shortest paths.

Note, although the term optimal path is used to describe, for example, the form of shortest, collision-free trajectories, it is not meant to be limiting and should not be taken to exclude any particular path that may be determined as an example path using the methods described herein.

Once the instructions indicative of an example of the training task have been determined, method 300 includes, at block 324, cause the graphical display to provide an indication of the instructions indicative of the example performance of the training task. In one example, the instructions for performing the optimal path (as noted above) may be displayed. Other instructions may be included as well. Using the instructions for performing the optimal path, the trainee may learn to perform the task in an optimal way, thereby improving his/her technique.

Figure 5:
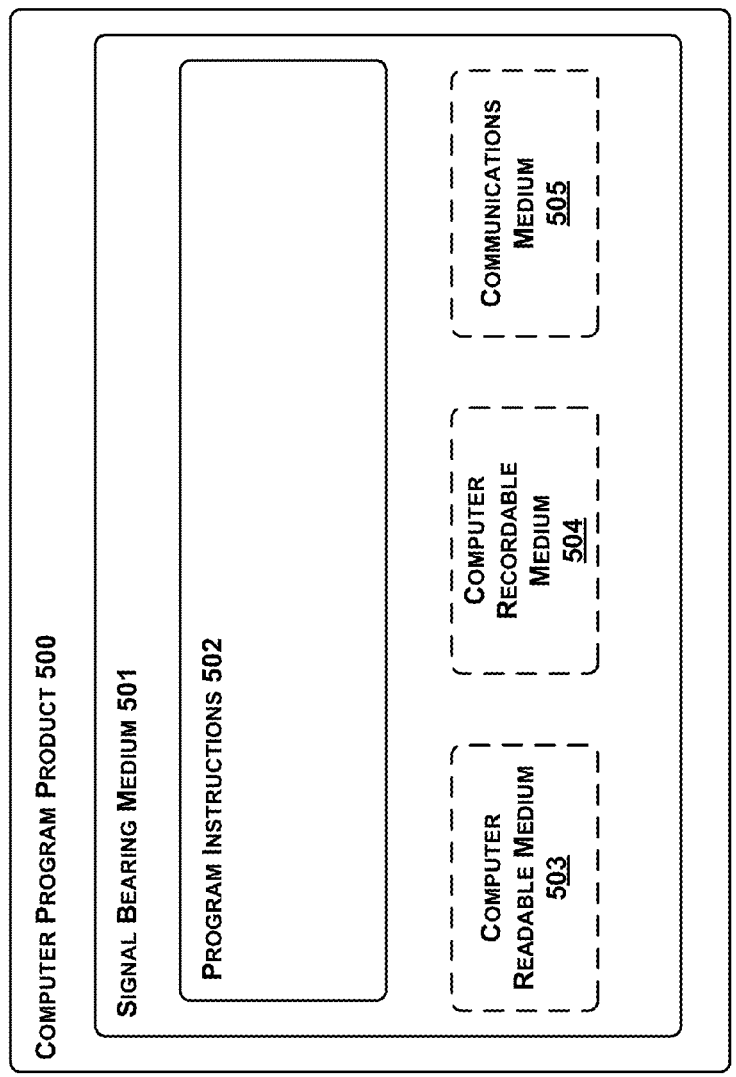
FIG. 5 illustrates an example computer program product, according to an example embodiment.

In some embodiments, the disclosed methods may be implemented as computer program instructions encoded on physical computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-3. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 505, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming with the IEEE 802.11 standard or other transmission protocol).

The one or more programming instructions 502 may be, for example, computer executable and/or logic implemented instructions. In some examples, a computing device such as the client device 220 of FIG. 2B may be configured to provide various operations, functions, or actions in response to the programming instructions 502 conveyed to the client device 220 by one or more of the computer readable medium 503, the computer recordable medium 504, and/or the communications medium 505.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
    receiving, at a processor of a training system, task-performance data from at least one sensor of the training system, wherein the training system further comprises at least one block component and at least one actuating component, wherein the at least one sensor, the at least one block component, and the at least one actuating component are associated with a training task, wherein the at least one sensor comprises at least one of: a touch sensor, an accelerometer, a light sensor, an infrared sensor, an ultrasonic sensor, a compass sensor, a radio-frequency sensor, and a motion tracking sensor, and wherein the at least one block component comprises at least one of: a connector, a brick, a rod, and a gear;
    determining, via the processor, an optimal motion plan to describe a collision-free trajectory to accomplish the training task by at least:
        determining a mesh of points representing a workspace for the training task,
        determining one or more time intervals that points in the mesh of points are to be reached to avoid collisions during the training task,
        determining the collision-free trajectory based on the mesh of points and the one or more time intervals, and
        causing a graphical display of the training system to provide the collision-free trajectory;
    determining, based on the received task-performance data, at least one trial task-performance metric corresponding to a trial performance of the training task;
    selecting at least one reference task-performance metric from a plurality of reference task-performance metrics, wherein each reference task-performance metric in the plurality corresponds to a respective reference performance of the training task;
    determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and causing the graphical display of the training system to provide an indication of the task-performance classification level.

2. The computer-implemented method of claim 1, further comprising:

determining, based on the received task-performance data, instructions indicative of an example performance of the training task; and causing the graphical display to provide an indication of the instructions indicative of the example performance of the training task.

3. The computer-implemented method of claim 2, wherein causing the graphical display to provide the indication of the instructions indicative of the example performance of the training task comprises causing the graphical display to provide a visual representation of the example performance of the training task, and wherein the example performance of the training task is based on an example path associated with the training task.

4. The computer-implemented method of claim 1, wherein the task-performance data comprises movement data associated with one or more of the at least one sensor, the at least one block component, or the at least one actuating component.

5. The computer-implemented method of claim 4, wherein the task-performance data further comprises video data indicative of the trial performance of the training task.

6. The computer-implemented method of claim 5, wherein receiving the task-performance data from the at least one sensor of the training system comprises receiving the task-performance data from the at least one sensor of the training system during the trial performance of the training task, the method further comprising causing the graphical display to display the video data.

7. The computer-implemented method of claim 1, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

8. The computer-implemented method of claim 1, wherein the training task comprises a task indicative of a surgical task.

9. The computer-implemented method of claim 1, wherein the at least one actuator comprises a stepper motor or a servomotor.

10. A system comprising:

at least one sensor comprising at least one of: a touch sensor, an accelerometer, a light sensor, an infrared sensor, an ultrasonic sensor, a compass sensor, a radio-frequency sensor, and a motion tracking sensor;

at least one block component comprising at least one of a connector, a brick, a rod, or a gear;

at least one actuating component, wherein the at least one sensor, the at least one block component, and the at least one actuating component are associated with a training task; and a processor that performs functions, the functions comprising:

receiving task-performance data from the at least one sensor;

determining an optimal motion plan to describe a collision-free trajectory to accomplish the training task by at least:

determining a mesh of points representing a workspace for the training task, determining one or more time intervals that points in the mesh of points are to be reached to avoid collisions during the training task, determining the collision-free trajectory based on the mesh of points and the one or more time intervals, and causing a graphical display to provide the collision-free trajectory;

determining, based on the received task-performance data, at least one trial task-performance metric corresponding to a trial performance of the training task;

selecting at least one reference task-performance metric from a plurality of reference task-performance metrics, wherein each reference task-performance metric in the plurality corresponds to a respective reference performance of the training task;

determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and causing the graphical display to provide an indication of the task-performance classification level.

11. The system of claim 10, wherein the functions further comprise:

determining, based on the received task-performance data, instructions indicative of an example performance of the training task; and causing the graphical display to provide an indication of the instructions indicative of the example performance of the training task.

12. The system of claim 11, wherein the functions further comprise:

causing the graphical display to provide a visual representation of the example performance of the trial training task, and wherein the example performance of the training task is based on an example path associated with the training task.

13. The system of claim 10, wherein the task-performance data comprises movement data associated with one or more of the at least one sensor, the at least one block component, or the at least one actuating component.

14. The system of claim 13, wherein the task-performance data further comprises video data indicative of the trial performance of the training task.

15. The system of claim 14, wherein receiving task-performance data from the at least one sensor comprises:

receiving the task-performance data from the at least one sensor during the trial performance of the training task; and causing the graphical display to display the video data.

16. The system of claim 10, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

17. The system of claim 10, wherein the training task comprises a task indicative of a surgical task.

18. The system of claim 10, wherein the at least one actuator comprises a stepper motor or a servomotor.

19. A non-transitory computer-readable medium having stored thereon program instructions executable by a processor of a training system to cause the processor to perform functions comprising:
receiving task-performance data from at least one sensor of the training system, wherein the training system further comprises at least one block component and at least one actuating component, wherein the at least one sensor, the at least one block component, and the at least one actuating component are associated with a training task, and wherein the at least one sensor comprises at least one of: a touch sensor, an accelerometer, a light sensor, an infrared sensor, an ultrasonic sensor, a compass sensor, a radio-frequency sensor, and a motion tracking sensor, and wherein the at least one block component comprises at least one of: a connector, a brick, a rod, and a gear;
determining an optimal motion plan to describe a collision-free trajectory to accomplish the training task by at least:
determining a mesh of points representing a workspace for the training task,
determining one or more time intervals that points in the mesh of points are to be reached to avoid collisions during the training task,
determining the collision-free trajectory based on the mesh of points and the one or more time intervals, and
causing a graphical display to provide the collision-free trajectory;
determining, based on the received task-performance data, at least one trial task-performance metric corresponding to a trial performance of the training task;
selecting at least one reference task-performance metric from a plurality of reference task-performance metrics, wherein each reference task-performance metric in the plurality corresponds to a respective reference performance of the training task;
determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and
causing the graphical display to provide an indication of the task-performance classification level.

20. The non-transitory computer-readable medium of claim 19, further comprising program instructions executable by the processor to perform functions comprising:
determining, based on the received performance data, instructions indicative of an example performance of the training task; and
causing the graphical display to provide an indication of the instructions indicative of the example performance of the training task.

21. The non-transitory computer-readable medium of claim 20, further comprising program instructions executable by the processor to perform functions comprising causing the graphical display to provide a visual representation of the example performance of the training task, wherein the example performance of the training task is based on an example path associated with the training task.

22. The non-transitory computer-readable medium of claim 19, wherein the task-performance data comprises movement data associated with one or more of the at least one sensor, the at least one block component, or the at least one actuating component.

23. The non-transitory computer-readable medium of claim 22, wherein the task-performance data further comprises video data indicative of the trial performance of the training task.

24. The non-transitory computer-readable medium of claim 23, further comprising program instructions executable by the processor to perform functions comprising:
receiving the task-performance data from the at least one sensor of the training system during the trial performance of the training task; and
causing the display device to display the video data.

25. The non-transitory computer-readable medium of claim 19, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

26. The non-transitory computer-readable medium of claim 19, wherein the training task comprises a task indicative of a surgical task.

27. The non-transitory computer-readable medium of claim 19, wherein the at least one actuator comprises a stepper motor or a servomotor.

28. A computer-implemented method comprising:
receiving, at a processor of a training system, task-performance data from at least one sensor of the training system, wherein the training system further comprises at least one block component and at least one actuating component, wherein the at least one sensor, the at least one block component, and the at least one actuating component are associated with a training task, wherein the at least one sensor comprises at least one of: a touch sensor, an accelerometer, a light sensor, an infrared sensor, an ultrasonic sensor, a compass sensor, a radio-frequency sensor, and a motion tracking sensor, and wherein the at least one block component comprises at least one of: a connector, a brick, a rod, and a gear;
determining, via the processor based on the received task-performance data, at least one trial task-performance metric corresponding to a trial performance of the training task, wherein determining at least one trial task-performance metric corresponding to a trial performance of the training task comprises:
determining a movement-speed graph of an instrument used in the training task as the instrument moves between at least two targets of the training task,
determining a peak speed task-performance metric based on a peak amplitude of the movement-speed graph, determining a continuity of movement task-performance metric based on the movement-speed graph, and causing a graphical display of the training system to provide the movement-speed graph;

determining, based on the received task-performance data, at least one trial task-performance metric corresponding to a trial performance of the training task;

selecting at least one reference task-performance metric from a plurality of reference task-performance metrics, wherein each reference task-performance metric in the plurality corresponds to a respective reference performance of the training task;

determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and causing the graphical display of the training system to provide an indication of the task-performance classification level.

29. The computer-implemented method of claim 1, further comprising:

causing the graphical display to display the collision-free trajectory.

30. The computer-implemented method of claim 28, further comprising:

determining, based on the received task-performance data, instructions indicative of an example performance of the training task; and causing the graphical display to provide an indication of the instructions indicative of the example performance of the training task.

31. The computer-implemented method of claim 30, wherein causing the graphical display to provide the indication of the instructions indicative of the example performance of the training task comprises causing the graphical display to provide a visual representation of the example performance of the training task, and wherein the example performance of the training task is based on an example path associated with the training task.

32. The computer-implemented method of claim 28, wherein the task-performance data further comprises video data indicative of the trial performance of the training task, wherein receiving the task-performance data from the at least one sensor of the training system comprises receiving the task-performance data from the at least one sensor of the training system during the trial performance of the training task, and wherein the method further comprises causing the graphical display to display the video data.

33. The computer-implemented method of claim 28, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

34. The computer-implemented method of claim 28, wherein the training task comprises a task indicative of a surgical task.

35. A system comprising:

at least one sensor comprising at least one of: a touch sensor, an accelerometer, a light sensor, an infrared sensor, an ultrasonic sensor, a compass sensor, a radio-frequency sensor, and a motion tracking sensor;

at least one block component comprising at least one of: a connector, a brick, a rod, and a gear;

at least one actuating component, wherein the at least one sensor, the at least one block component, and the at least one actuating component are associated with a training task; and a processor that performs functions, the functions comprising:

receiving task-performance data from the at least one sensor;

determining, based on the received task-performance data, at least one trial task-performance metric corresponding to a trial performance of the training task, wherein determining at least one trial task-performance metric corresponding to a trial performance of the training task comprises:

determining a movement-speed graph of an instrument used in the training task as the instrument moves between at least two targets of the training task, determining a peak speed task-performance metric based on a peak amplitude of the movement-speed graph, determining a continuity of movement task-performance metric based on the movement-speed graph, and causing a graphical display to provide the movement-speed graph;

determining, based on the received task-performance data, at least one trial task-performance metric corresponding to a trial performance of the training task;

selecting at least one reference task-performance metric from a plurality of reference task-performance metrics, wherein each reference task-performance metric in the plurality corresponds to a respective reference performance of the training task;

determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and causing the graphical display to provide an indication of the task-performance classification level.

36. The system of claim 35, further comprising:

determining, based on the received task-performance data, instructions indicative of an example performance of the training task; and causing the graphical display to provide an indication of the instructions indicative of the example performance of the training task.

37. The system of claim 36, wherein causing the graphical display to provide the indication of the instructions indicative of the example performance of the training task comprises causing the graphical display to provide a visual representation of the example performance of the training task, and wherein the example performance of the training task is based on an example path associated with the training task.

38. The system of claim 35, wherein the task-performance data further comprises video data indicative of the trial performance of the training task,
  wherein receiving the task-performance data from the at least one sensor of the training system comprises receiving the task-performance data from the at least one sensor of the training system during the trial performance of the training task, and
  wherein the functions further comprise causing the graphical display to display the video data.

39. The system of claim 35, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

40. The system of claim 35, wherein the training task comprises a task indicative of a surgical task.

41. A non-transitory computer-readable medium having stored thereon program instructions executable by a processor of a training system to cause the processor to perform functions comprising:
  receiving task-performance data from at least one sensor of the training system, wherein the training system further comprises at least one block component and at least one actuating component, wherein the at least one sensor, the at least one block component, and the at least one actuating component are associated with a training task, wherein the at least one sensor comprises at least one of: a touch sensor, an accelerometer, a light sensor, an infrared sensor, an ultrasonic sensor, a compass sensor, a radio-frequency sensor, and a motion tracking sensor, and wherein the at least one block component comprises at least one of: a connector, a brick, a rod, and a gear;
  determining, based on the received task-performance data, at least one trial task-performance metric corresponding to a trial performance of the training task, wherein determining at least one trial task-performance metric corresponding to a trial performance of the training task comprises:
    determining a movement-speed graph of an instrument used in the training task as the instrument moves between at least two targets of the training task,
    determining a peak speed task-performance metric based on a peak amplitude of the movement-speed graph,
    determining a continuity of movement task-performance metric based on the movement-speed graph, and
    causing a graphical display to provide the movement-speed graph;
  determining, based on the received task-performance data, at least one trial task-performance metric corresponding to a trial performance of the training task;
  selecting at least one reference task-performance metric from a plurality of reference task-performance metrics, wherein each reference task-performance metric in the plurality corresponds to a respective reference performance of the training task;
  determining, based on a comparison of the at least one trial task-performance metric to the at least one reference task-performance metric, a task-performance classification level of a plurality of task-performance classification levels that are specified by a plurality of transitional points, and wherein the plurality of transitional points are determined based on received task-performance data whose trial task-performance metrics satisfy a metric range limit; and
  causing the graphical display to provide an indication of the task-performance classification level.

42. The non-transitory computer-readable medium of claim 41, further comprising:
  determining, based on the received task-performance data, instructions indicative of an example performance of the training task; and
  causing the graphical display to provide an indication of the instructions indicative of the example performance of the training task.

43. The non-transitory computer-readable medium of claim 42, wherein causing the graphical display to provide the indication of the instructions indicative of the example performance of the training task comprises causing the graphical display to provide a visual representation of the example performance of the training task, and wherein the example performance of the training task is based on an example path associated with the training task.

44. The non-transitory computer-readable medium of claim 41, wherein the task-performance data further comprises video data indicative of the trial performance of the training task,
  wherein receiving the task-performance data from the at least one sensor of the training system comprises receiving the task-performance data from the at least one sensor of the training system during the trial performance of the training task, and
  wherein the functions further comprise causing the graphical display to display the video data.

45. The non-transitory computer-readable medium of claim 41, wherein the at least one trial task-performance metric comprises one or more of a trial time period, a trial movement length, a trial movement direction, a trial peak speed width, or a trial continuity of movement, and wherein the at least one reference task-performance metric comprises one or more of a reference time period, a reference movement length, a reference movement direction, a reference peak speed width, or a reference continuity of movement.

46. The non-transitory computer-readable medium of claim 41, wherein the training task comprises a task indicative of a surgical task.

* * * * *